United States Patent
Fapojuwo

(12) 
(10) Patent No.: US 6,212,389 B1
(45) Date of Patent: *Apr. 3, 2001

(54) METHODS AND APPARATUS FOR CONTROLLING ALLOCATION OF TRAFFIC CHANNELS IN MACROCELL/MICROCELL TELECOMMUNICATIONS NETWORKS

(75) Inventor: Abraham O. Fapojuwo, Calgary (CA)

(73) Assignee: Nortel Networks Limited, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/126,994

(22) Filed: Jul. 31, 1998

Related U.S. Application Data

(63) Continuation-in-part of application No. 08/832,635, filed on Apr. 4, 1997.
(60) Provisional application No. 60/054,602, filed on Aug. 2, 1997.

(51) Int. Cl.$^7$ ...................................................... H04Q 7/20

(52) U.S. Cl. .......................... 455/453; 455/453; 455/436; 455/422; 455/449; 455/450

(58) Field of Search ................................... 455/436, 439, 455/443–445, 450, 62, 452, 560

(56) References Cited

U.S. PATENT DOCUMENTS 4,670,899 * 6/1987 Brody et al. ............................ 379/60

* cited by examiner

Primary Examiner—Reinhard Eisenzopf
Assistant Examiner—Meless Zewdu N
(74) Attorney, Agent, or Firm—Jeff Measures

(57) ABSTRACT

In methods and apparatus for controlling allocation of traffic channels in a telecommunications network having macrocells and microcells within the macrocells, a macrocell traffic channel is allocated in response to a request for a microcell traffic channel only when no suitable microcell traffic channel is available, a suitable macrocell traffic channel is available, and the requested microcell traffic channel is requested to implement a microcell to microcell handoff. Allocation of the macrocell traffic channel may further be conditional on a grade of service in the macrocell being deemed acceptable. The grade of service may be deemed acceptable when number of macrocell traffic channels assigned to each microcell is less than a predetermined maximum number of allowable macrocell traffic channels that can be assigned to each microcell (cutoff value) or when more than a threshold number of macrocell channels are available in the macrocell. The system determines whether a call is a data call and implements throttling of the channels allocated to existing data calls to optimize system capacity and data throughput.

31 Claims, 12 Drawing Sheets

Channel Allocation algorithm used by the Local Channel Manager during *data or video call* establishment Channel Throttling Algorithm: Throttling up mode Channel Allocation algorithm used by the Global Channel Manager during *data or video call* (originated in a microcell) establishment

METHODS AND APPARATUS FOR CONTROLLING ALLOCATION OF TRAFFIC CHANNELS IN MACROCELL/MICROCELL TELECOMMUNICATIONS NETWORKS

RELATED APPLICATION

This application is a continuation-in-part of U.S. patent application Ser. No. 08/832,635 filed Apr. 4, 1997, and claims benefit of Provisional No. 60/054,602, filed Aug. 2, 1997.

FIELD OF THE INVENTION

The present invention relates to telecommunications networks having macrocells and microcells within the macrocells. In particular, the invention relates to methods and apparatus for controlling allocation of traffic channels in such telecommunications networks.

BACKGROUND OF THE INVENTION

Radiotelephone communication using mobile communication terminals in mobile telecommunication systems has become very popular. Conventional systems are controlled by at least one mobile services switching center, or MSC, at least one base station, or BS, serving at least one mobile station. The base station acts as a conduit for information between the mobile stations and the MSC. Calls to and from mobile subscribers are switched by the MSC which in addition provides all signalling functions needed to establish the calls. In addition, the MSC constitutes an interface between the radio-based communication system and the public switching telephone network, or PSTN.

In order to provide adequate radio coverage of the service area, plural base stations are usually required. The service area is usually divided into so-called macrocells, each normally served by its own base station (in some cases it can share a base station with a number of other cells). Each macrocell can provide communication services via radio link between the macrocell base station and mobile stations (terminals) located in this macrocell, usually in the range of about several kilometers. Assigned to the macrocell are a number of unique communication channels which are usable throughout the macrocell area, i.e. only a single mobile communication terminal operating within the macrocell area may be assigned to any particular macrocell communication channel.

Macrocells are deployed during the initial rollout of a cellular network to provide wide-area coverage. As the cellular network matures, the need for more system capacity arises and one proposal for meeting this need is deployment of so-called microcells as underlay of an existing macrocell. The macrocell area is divided into a number of smaller geographical areas, or microcells, typically of several hundred meters in diameter. Associated with the microcells are a number of microcell communication channels. Certain microcell areas share the same channels, i.e. multiple mobile communication terminals can be assigned to the same communication channel as long as all of the terminals are located in different microcell areas which are geographically separated. Because of geographical separation and assuming low power levels employed with terminals served by microcells, no interference would occur thereby enabling more terminals to be used within a particular macrocell without the need to preempt additional channels. Such a network configuration is often referred to as hierarchical micro-/macrocellular network.

Though hierarchical micro-/macro-cellular networks allow for much more efficient use of frequency spectrum and hardware resources, there are some problems associated with their operation. After a call in a cell is set up, the quality of the radio link must be monitored to ensure high quality uninterrupted service during the communication session. If the quality of the radio link drops below a redefined level or the terminal moves between cells, the assigned communication channel should be changed or the call should be switched to another base station (a process known as handoff). Since each microcell covers a relatively small area, moving terminals are likely to traverse multiple microcells during a particular communication session. As a result, multiple microcell communication channels have to be used and multiple transfers or handoffs would be required, tying up multiple channels and transfer resources for a single communication session. During peak use periods or in congested urban areas there may be no other target base station receiving a signal of sufficient strength from the terminal or/and no free channel to be used to implement a required handoff. This can lead to an unacceptable call connection deterioration and the call can be lost altogether.

A number of techniques have been used to cope with these problems. Call blockage has been avoided during periods of high demand (when a cell may not have unallocated channels available for handling new calls or call handoffs) by giving microcell-to-microcell handoff requests priority over new call requests originating from a microcell. U.S. Pat. No. 5,301,356 to Bodin (1994) discloses a system and method for ensuring that handoff requests take priority over new call requests to engage voice channels assigned to a specific target cell. According to this technique, a determination is made whether any voice channels of the target cell are available for assignment to call requests. If none is available, handoff requests to the target cell are stored in a queue for a predetermined period of time. New call requests are denied to be served until the queue is empty.

Similarly, U.S. Pat. No. 4,670,899 to Brody (1987) describes a method to avoid call blockage during periods of high demand when a cell may have no free channels available for handling new calls or call handoffs. In this case, the cell utilization is monitored to determine the mode of operation each cell will be directed to. In one of the two predetermined modes of operation voice channels are reserved for incoming handoffs by denying access for mobile transceivers initiating new calls. Such a microcell traffic management technique helps to protect already established calls from being dropped due to a lack of free channels to make an urgently needed handoff, but does not ensure efficient use of the overall communication system capacity.

Another idea is to temporarily use currently available macrocell channels as a backup for microcell communication traffic. The most radical proposal is not to allow microcell-to-microcell handoffs under any circumstances. Any handoff occurs only via the macrocell layer (U.S. Pat. No. 5,278,991 to Ramsdale, 1994). After the terminal has been served by the macrocell for a sufficiently long period, the downward macrocell-to-microcell handoff is performed. Though substantial improvement in the grade of service for the microcell calls can be achieved through implementation of this idea, it can place a great strain on the macrocell layer because handoffs originating from a microcell compete for communication channels with macrocell-to-macrocell handoffs and new calls originating from the macrocell.

A more moderate approach disclosed in U.S. Pat. No. 5,548,806 to Yamaguchi (1996) and U.S. Pat. No. 5,396,645 to Huff (1995) is based upon the estimation of the moving terminal speed at a predetermined interval. The terminal is allocated a channel to the microcell base station when moving slowly, and is allocated a channel to the macrocell base station when moving rapidly. Thus, frequent handoff between microcells of rapidly moving terminals can be avoided. Though this approach allows for more flexible interaction between microcell and macrocell layers, it does not take into account the traffic characteristics in both layers of the network. It will not help, for example, in a situation when the number of slowly moving terminals exceeds the microcell traffic capacity. In some cases microcell-to-macrocell handoff can take place, for example, even if free channels are available in the microcell layer.

In summary, known methods for using macrocell channels to carry overflow microcell traffic give an improvement in the grade of service (measured by call blocking) for microcell calls, but at the expense of the grade of service experienced by macrocell calls. The problem of poorer grade of service for macrocell subscribers (when macrocell channels are shared with microcell calls) worsens under heavy macrocell traffic conditions.

Furthermore, Advanced wireless networks of the future must have capability for handling multimedia traffic in the most efficient and cost-effective manner. In such a network, a "call" can be a "voice" call or a data call (which can include video, audio, etc.). Large capacity is required both at the air interface and wired backbone interfaces to meet the diverse requirements of the different traffic types. Currently, hierarchical micro-/macro-cellular networks (HCNs), as illustrated in FIG. 1, are being deployed by wireless service providers to achieve higher capacity for wireless voice traffic in metropolitan areas. One aspect of this invention pertains to the handling of multimedia traffic comprising voice, data, video, image, etc. in an HCN.

The problem associated with the handling of multimedia traffic in an HCN may be formulated as follows: Given n classes of traffic (with specified bandwidth and quality of service objectives) offered to a microcell such that traffic that cannot be handled by the microcell overflow to the overlaid macrocell, also given m classes of traffic offered to the macrocell, the problem is to determine the call admission control policies to be employed by the HCN such that the quality of service objectives for all the traffic types are simultaneously met. One aspect of this invention proposes methods and apparatus for handling multimedia traffic in an HCN.

SUMMARY OF THE INVENTION

It is therefore an object of the present invention to provide methods and apparatus for efficient traffic channel management in hierarchical micro-/macro-cellular networks.

One aspect of the present invention provides a method for controlling allocation of traffic channels in a telecommunications network having macrocells and microcells within said macrocells. The method comprises:

receiving a request for a number of microcell traffic channels in a particular microcell; and allocating said number of macrocell traffic channels in a macrocell containing said particular microcell when and only when:

(a) insufficient microcell traffic channels are available in said particular microcell;

(b) sufficient macrocell traffic channels are available in said macrocell; and (c) the requested microcell traffic channels are requested to implement a microcell to microcell handoff.

According to this method, macrocell traffic channels are allocated to microcell traffic only when needed to implement microcell to microcell handoffs. Consequently, impact of microcell traffic on macrocell grade of service is permitted only to ensure that established microcell calls are not dropped. This limits the impact of microcell traffic on macrocell grade of service.

In an embodiment of the above method, the macrocell traffic channel is allocated when and only when conditions (a), (b) and (c) are met, and:

(d) a grade of service in the macrocell is deemed to be acceptable.

The grade of service in the macrocell may be deemed acceptable when a number of macrocell traffic channels assigned to each microcell is less than a predetermined maximum number of allowable macrocell traffic channels that can be assigned to each microcell (cutoff value). Each of a plurality of microcells may have a cutoff value which may be configurable independently. The configurable cutoff values make the proposed channel allocation system very flexible and permit management of the balance between microcell and macrocell grade of service.

The grade of service in the macrocell may also be deemed acceptable when more than a threshold number of macrocell channels are available in said macrocell.

The threshold number of traffic channels for each macrocell may be configurable independently of the threshold numbers of traffic channels configured for other macrocells.

The configurable threshold numbers permit management of the balance between microcell grade of service and macrocell grade of service on a macrocell by macrocell basis.

Another aspect of the invention relates to handling multimedia traffic. According to this aspect of the invention, both voice and data calls are handled as described above. However, data calls may be allocated more than one traffic channel, depending on the nature of the call and the current network capacity. The number of channels allocated to a particular data call can be varied (a process called throttling) so as to optimize the throughput of the data call when there is excess capacity, while maximizing the total number of calls.

Another aspect of the invention provides a method for controlling allocation of traffic channels in a telecommunications network having macrocells and microcells within said macrocells, the method comprising:

(a) receiving a request for a number of microcell traffic channels in a particular microcell;

(b) determining there are insufficient microcell traffic channels available in said particular microcell;

(c) allocating said requested number of microcell traffic channels if sufficient microcell channels are available;

(d) responsive to step (b) determining that insufficient microcell channels are available:

i) determining whether sufficient macrocell traffic channels are available in said macrocell;

ii) allocating macrocell channels if sufficient channels are available; and iii) sending a message indicating insufficient channels are available channels if sufficient channels are not available.

Another aspect of the invention provides a telecommunications system having macrocells and microcells within said macrocells. The system comprises a local channel manager and a global channel manager for carrying out the methods described herein.

Another aspect of the invention provides a processor-readable storage medium for storing instructions for execution by a processor for carrying out the methods described herein. For example, according to one embodiment the instructions comprise instructions for responding to a request for a microcell traffic channel in a particular microcell by allocating a microcell traffic channel in the particular microcell when at least one microcell traffic channel is available in the particular microcell. The instructions further comprise instructions for sending a message to a remote processor when no microcell traffic channel is available in the particular microcell and the requested microcell traffic channel is requested to implement a microcell to microcell handoff.

Yet another aspect of the invention provides a processor-readable storage medium storing instructions for execution by a processor, the instructions comprising instructions for receiving a message sent from a remote processor, the messages requesting allocation of a macrocell traffic channel. The instructions further comprise instructions for responding to the message by causing a macrocell traffic channel to be allocated in a macrocell containing the particular microcell when at least one macrocell traffic channel is available in the macrocell and a grade of service in said macrocell is deemed to be acceptable.

The instructions for responding to the message by causing a macrocell traffic channel to be allocated may comprise instructions for sending a message to a remote processor instructing the remote processor to allocate the macrocell traffic channel.

BRIEF DESCRIPTION OF THE DRAWINGS

The foregoing summary of the present invention, as well as the following detailed description of example embodiments of the invention, will be better understood when read in conjunction with the appended drawings. For the purpose of illustrating the invention, there is shown in the drawings embodiments which are presently preferred, it being understood, however, that the invention is not limited to the specific arrangements and steps disclosed. In the drawings.

DETAILED DESCRIPTION OF THE PREFERRED EMBODIMENTS

The preferred embodiments of the invention will now be described. In this specification a data call can include video, audio, multimedia as well as conventional data calls.

Figure 1:
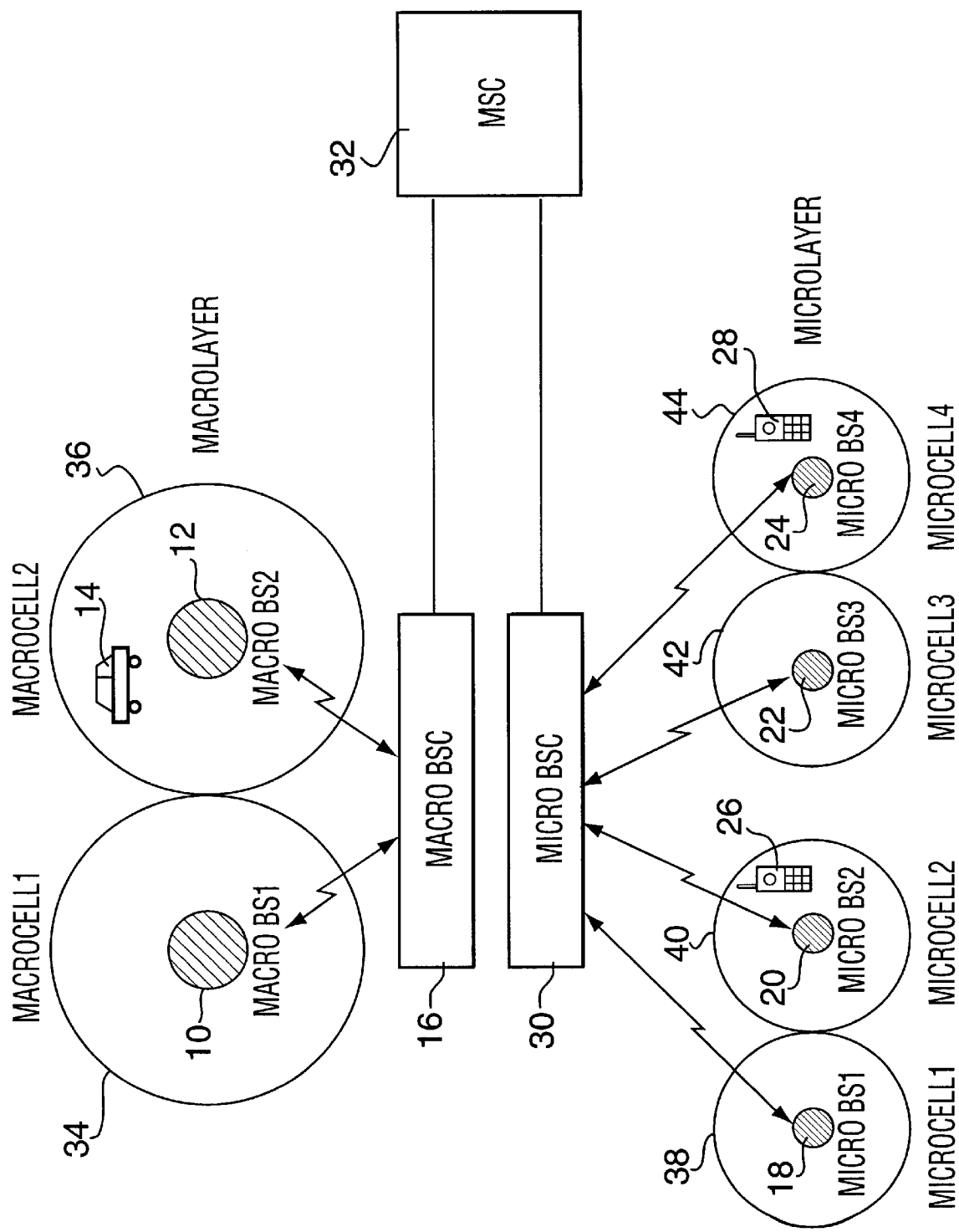
FIG. 1 is a block schematic diagram of a hierarchical micro-/macro-cellular network according to an embodiment of the invention.

A block schematic diagram of a hierarchical micro-macro-cellular network is shown in FIG. 1. The network includes a plurality of macrocell base stations 10, 12 (macroBS), a plurality of mobile radio transceivers (only one transceiver 14 is shown), a macrocell base station controller 16 (macroBSC), a plurality of microcell base stations 18, 20, 22, 24 (microBS1–microBS4), a plurality of handsets (only two handsets 26 and 28 are shown), a microcell base station controller 30 (microBSC) and a mobile services switching center 32 (MSC). MacroBSs 10, 12 are installed at fixed locations separated from one another within a geographical area to be served with a macrocell range of several kilometers. Each macroBS defines a geographical macrocell (for example, macroBS 10 serves macrocell1 34, macroBS 12 serves macrocell2 36). MacroBSs 10, 12 establish bidirectional communications with mobile transceivers 14 within the service area of the communication system. MacroBSC 16 controls the operation of each macroBS 10, 12.

MicroBSs 18–24 are deployed within the umbrella coverage of the macrocells 34, 36 at fixed locations separated from one another by about several hundred meters. Each of the microBSs 18–24 defines a geographical microcell 38–44 respectively (for example, microBS 18 serves microcell1, microBS 20 serves microcell2, etc.). The microBS 20 establishes bi-directional communications with handset 26 and microBS 24 establishes bi-directional communications with handset 28 within the service area of the communication system. MicroBSC 30 controls the operation of each microBS 18–24.

Calls to and from mobile subscribers 14, 26, 28 are switched by the MSC 32 which also provides all signalling functions needed to establish the calls. The MSC 32 also acts as an interface between the radio-based cellular system and the public switching telephone network.

After a call is set up, the quality of the radio link is monitored by a mobile station (for example, 26) and/or by the associated cell base station (in our case microBS 20). Since the microcell2 40 is small, chances are that the mobile station 26 will move from microcell2 40 to another microcell (for example, 38) during an already established communication session. To prevent the communication session from undesirable interruption, the call is switched to microBS 18 before the call quality is seriously deteriorated. Normally, such a call handoff is accomplished between the cells of the network layer from which the call was originated (as described in our example), but in the areas of high traffic density or during peak usage there may be no suitable candidate for the handoff except the base station of the overlaying cell (in our case macroBS 10). Borrowing a free channel from the umbrella (also called overlaying) cell 34 may be the only option for preventing the call from being dropped. This may be acceptable in the areas of a relatively light macrocell communications traffic where unneeded macrocell traffic channels are available, but may limit the ability of the macrocell to serve macrocell users if macrocell traffic is also high. If, for example, saving a call served by microBS 20 by the handing off to the macroBS 10 results in dropping calls originating in the macrocell1 34, the overall network performance decreases.

To provide a balance between microcell grade of service and macrocell grade of service, a Local Channel Manager (LCM) 50 is provided to allocate microcell traffic channels, and a Global Channel Manager (GCM) 52 is provided to allocate macrocell traffic channels. The LCM 50 and the GCM 52 each comprise a processor and a processor-readable storage medium storing instructions for execution by the processor to perform LCM and GCM functions as described below. In this embodiment, LCM 50 is associated with the microBSC 30 and GCM 52 is associated with the MSC 32. Note that the processors and storage media used to implement the LCM and GCM functions may be shared with other microBSC and MSC functions.

Figure 2:
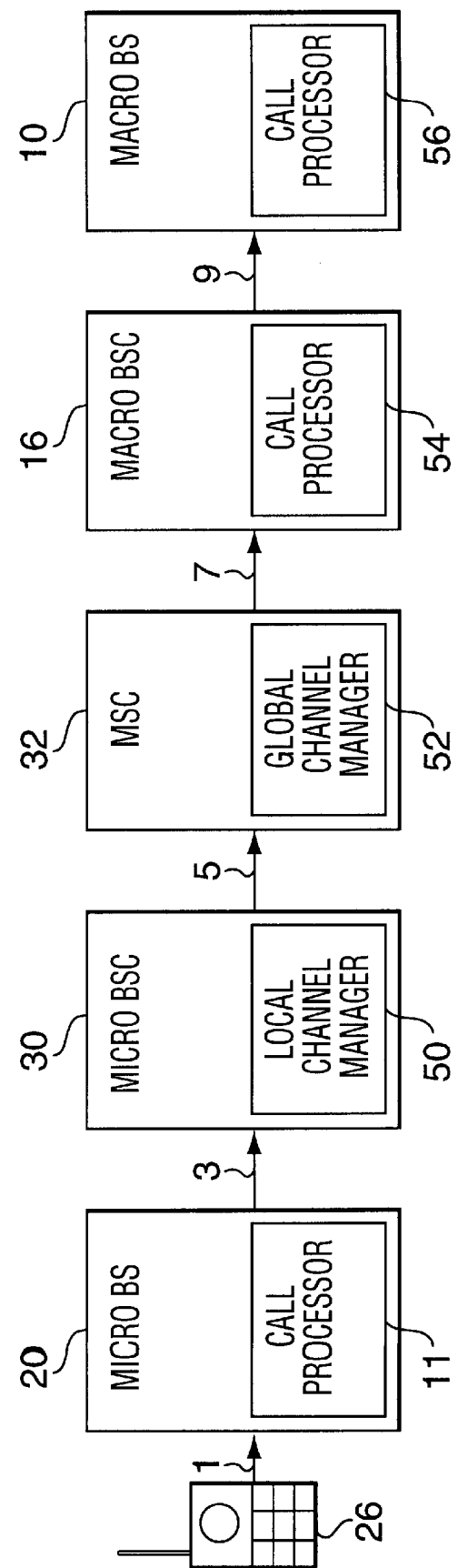
FIG. 2 is a diagram illustrating a call processing sequence according to an embodiment of the invention.

FIG. 2 illustrates a call processing sequence of steps utilizing LCMs 50 and the GCMs 52 according to an embodiment of the invention. When a handset 26 sends a channel assignment request message 1 to the microBS 20 it is processed by a call processor 11 and transferred as a message 3 to the LCM 50 located at the microBSC 30. The LCM 50 is designed to manage the allocation of microBS channels at all the microcells controlled by the microBSC 30 and to interact with the macro layer of the network by sending macroBS channel assignment request messages 5 to the GCM 52, if appropriate.

The GCM 52 located at the MSC 32 manages the allocation of macroBS channels at all the macrocells controlled by the macroBSC 16 by sending a macroBS channel assignment request message 7 to the macroBSC 10 when appropriate. The macroBSC 10 allocates a traffic channel and sends a macro BS channel allocation command 9 to the appropriate macroBS 10–12 to set up the allocated channel.

Channel allocation processes used by the LCM will be described further in more detail with reference to FIG. 3a and 3b. The LCM manages the allocation of microBS channels at all the microcells controlled by the microcell BSC. The LCM keeps record of the number of free and busy channels at each microBS. At each call setup instance the microBS, whose cell the call originates from, sends a channel assignment request message to the LCM. This message preferably contains 3 fields:

(a) traffic type field: voice, or data;

(b) service type field: new call or handoff call; and (c) number of channels required field: 1 for a voice call or the minimum and maximum number of channels required by data or video call.

Note that MicroBS can determine the contents of (b), and typically it can obtain an indication from the terminal as to (a). Field (c) is optional. Preferably advanced terminals will send an indication upon sending a call setup message as to the size (or type) of the data file being transmitted. For example, it would be advantageous to allocate a plurality of channels for a large data file (eg., a video file), whereas only one channel is necessary for a short text message (e.g., a simple e-mail file). For cases where the terminal sends an indication as to the type of call (voice or data) but not the size/type of file, a predetermined default number of channels can be used. Most data applications will function with a minimum of 1 channel. However, some real-time data transfers, for example a real-time multimedia call (e.g., a video conference) will require a minimum number greater than 1.

Figure 3A:
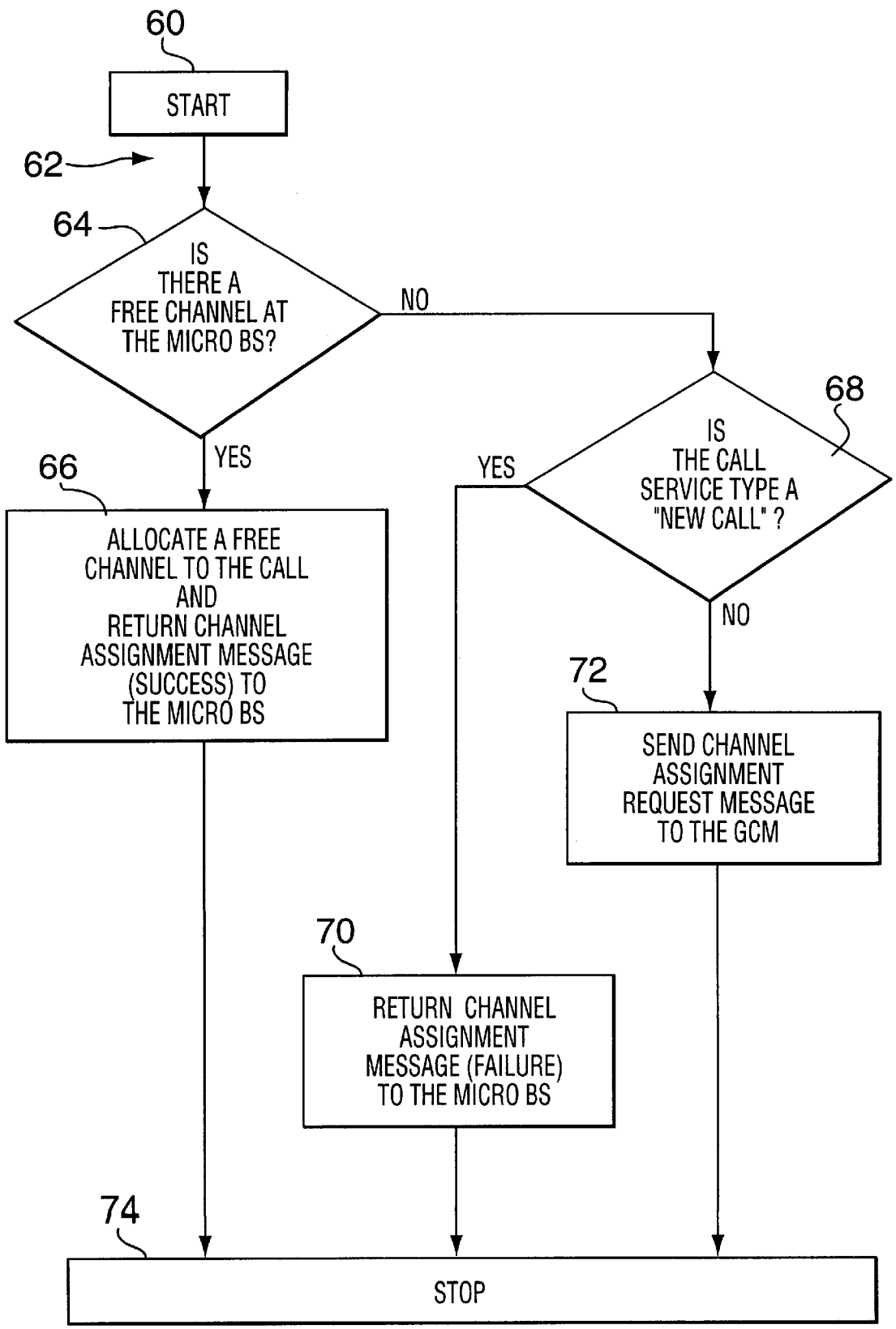
FIGS. 3a and 3b are flowcharts of a channel allocation process used by Local Channel Manager according to an embodiment of the invention.

FIG. 3a shows flowchart of the channel allocation process used by the LCM for admitting a voice call originated in a microcell according to an embodiment of the invention. Upon start up (block 60), the LCM determines whether there is a free channel at the microBS (block 64). If at least one channel is available routine 60 allocates a free channel to the incoming call, returns a channel assignment message (success) to the microBS (block 66) and stops its operation (block 74). If none of the channels is available routine 62 determines the call service type (block 68). Determining the type of call is necessary because the call processing procedure for new calls originating in a microcell is treated differently than microcell-to-microcell handoff calls according to this embodiment. If step 68 determines that the request is for a new call, the system denies access to the macroBS channels for a new call by sending a return channel assignment message (failure) to the microBS (block 70), stops its operation (block 74), and the call is blocked. If the call service type is determined to be an existing call which is requesting a microcell-to-microcell handoff, the LCM sends a channel assignment request message to the GCM (block 72). After this the LCM stops its operation (block 74) until further requests are received. This process reduces stress imposed by the overflowing microcell-to-macrocell calls on the macrocell layer of the network, but still leaves room for the improvement of the grade of service of the microcell subscribers.

Figure 3B:
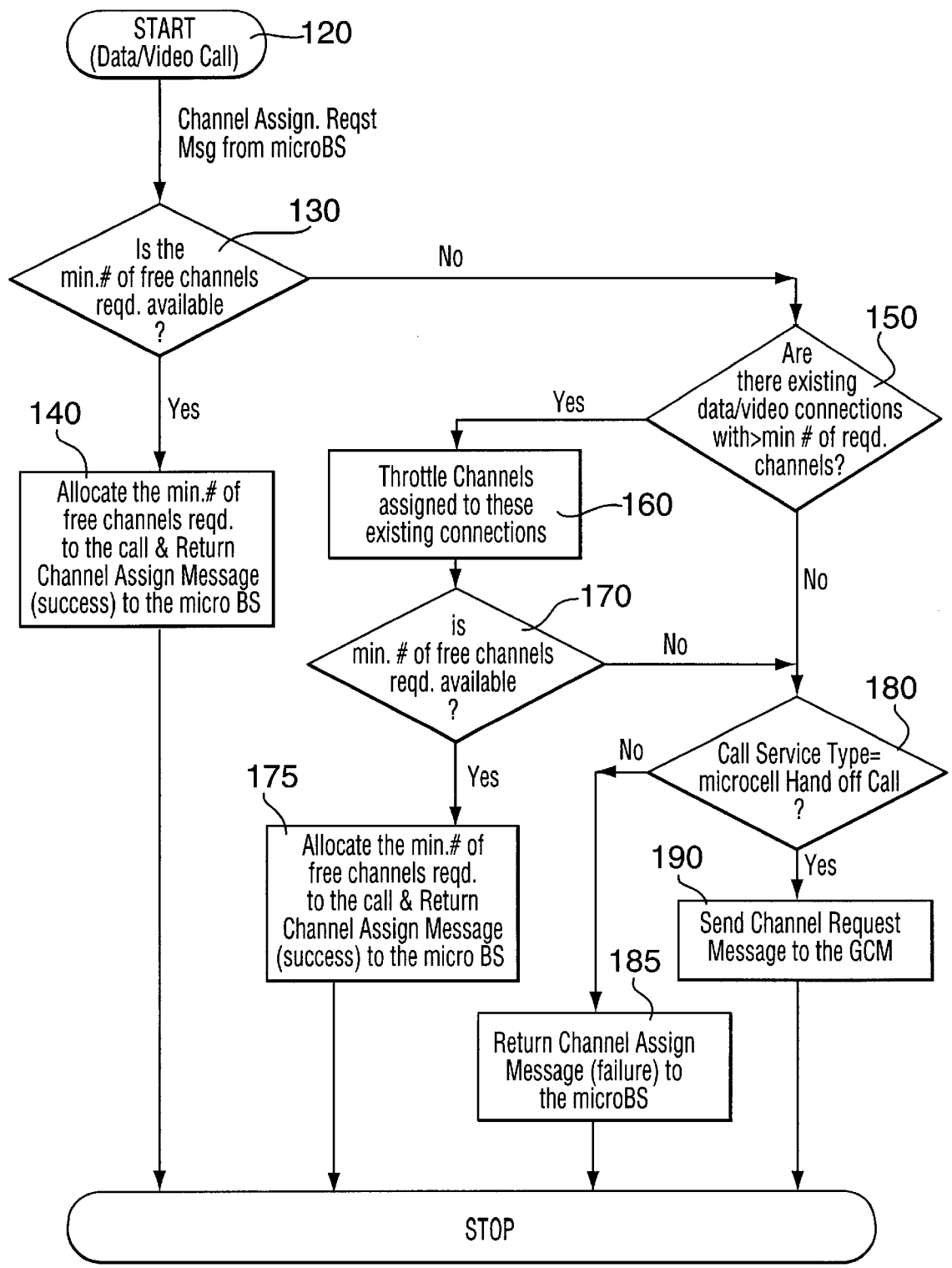
Figure 4A:
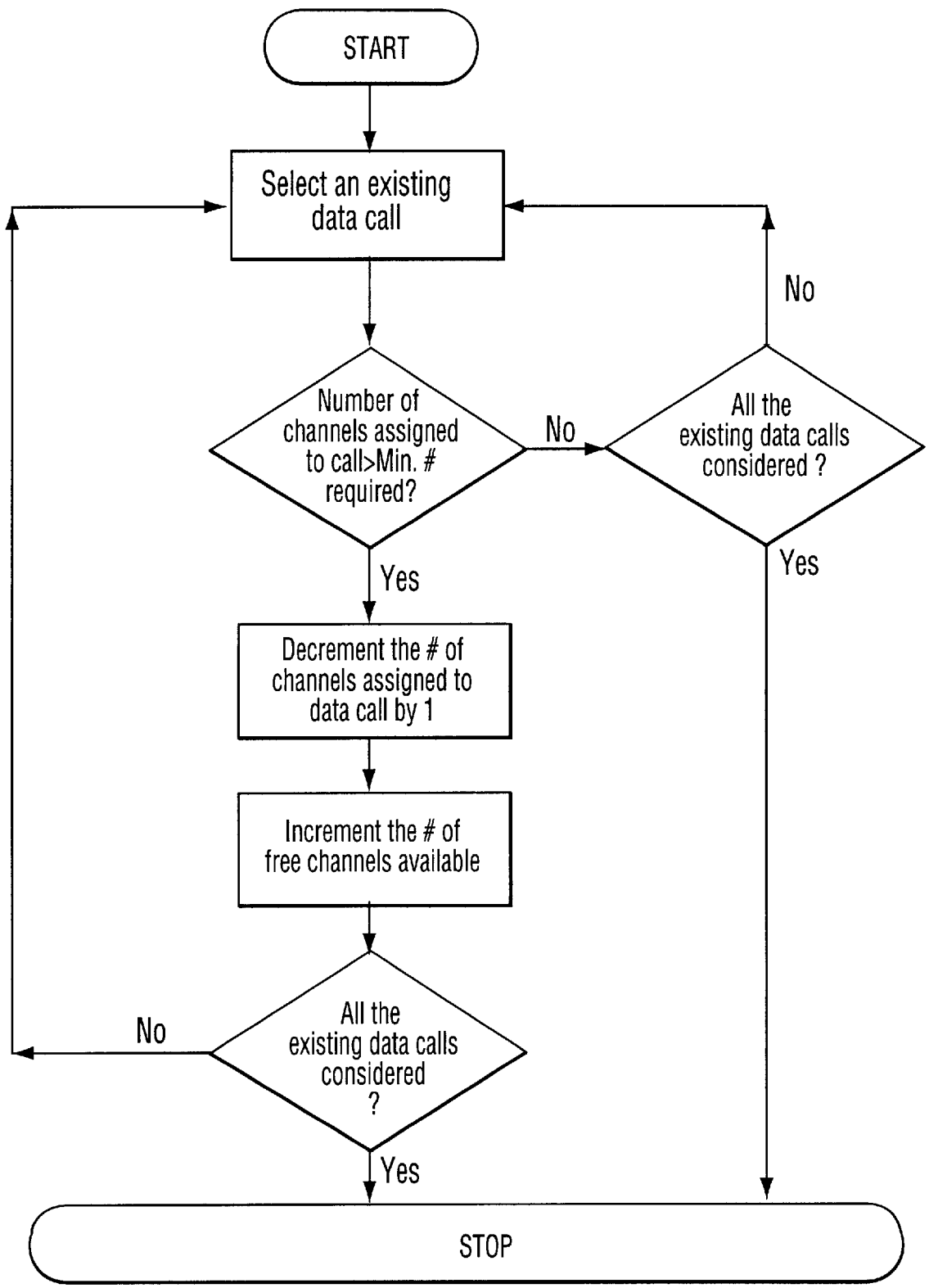
FIGS. 4a and 4b are flowcharts of throttling according to an embodiment of the invention.

FIG. 3b shows a flow chart of the channel allocation process used by the LCM for processing channel requests from a data call originated in a microcell according to an embodiment of the invention. If the info content of the traffic type field is data (which as stated can include video) 120, the LCM first determines whether the minimum number of requested channels is available 130 and allocates the minimum number of channels required by the call if available 140. Otherwise, the LCM preferably determines whether additional channels can be made available 150 by determining whether existing data calls have been allocated more than their minimum number of channels. If so, theLCM enters channel throttling down mode 160 wherein the LCM creates additional free channels by reducing the channels already allocated to the existing data and video calls supported by the microBS (see FIG. 4a). At the end of throttling down mode, the LCM allocates the minimum number of channels required by the call if available 170, 175. If all the existing data and video calls supported by the microBS are already operating at their minimum channel usage, the LCM determines whether the request is for a new call or an existing call requesting channels for a handoff 180. The LCM then either returns channel assignment failure message back to the microBS (if 'new call') 185 or triggers microcell BSC to macrocell BSC handoff (if 'microcell-to-microcell handoff call') 190. In the latter case, the LCM sends a macroBS channel assignment request message to the Global Channel Manager (located at the MSC) and then waits for a response.

Figure 4B:
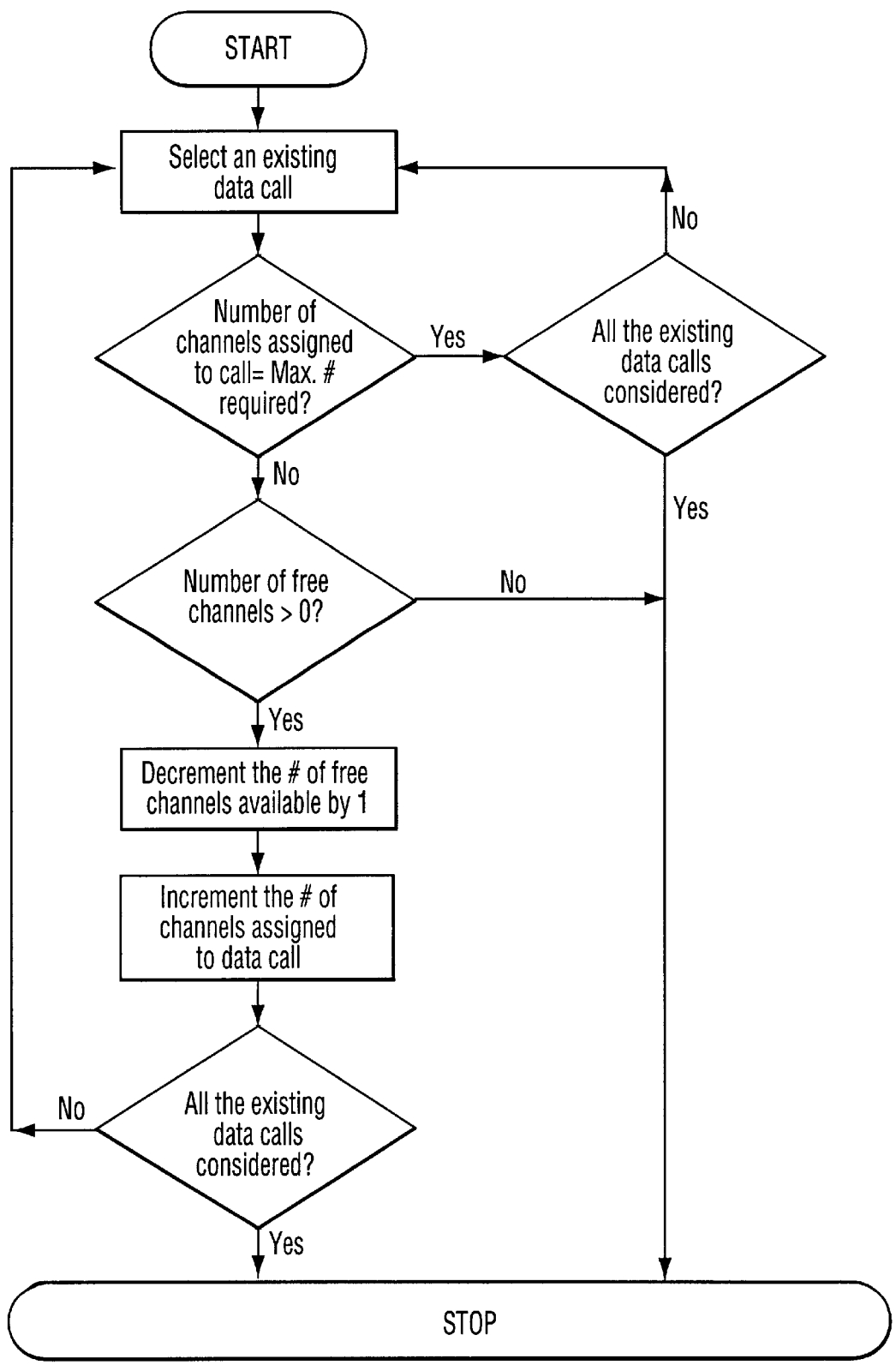

In order to achieve a high throughput for data calls, the LCM preferably carries out the step of throttling up the number of channels allocated to existing data calls if free channels are available. For example, FIG. 4b illustrates a process where at the completion of each call, the LCM invokes a channel throttling up mode process to increase the channel allocation of existing data and video calls that are connected with less than the maximum number of channels required according to an embodiment of the invention.

The GCM manages the allocation of macroBS channels at all the macrocells in the network. It also keeps track, for each macroBS in the network, the number of macroBS channels that have been allocated to each of the microcells underlaying a macrocell. Upon receipt of a channel assignment request message from the LCM, the GCM after performing the necessary call processing either returns a macroBS channel assignment failure message to the microcell BSC or allocates macroBS channel(s) to handle the overflow microcell call. A failure message is returned if there are insufficient free traffic channels available at the macroBS to satisfy the request.

Figure 5A:
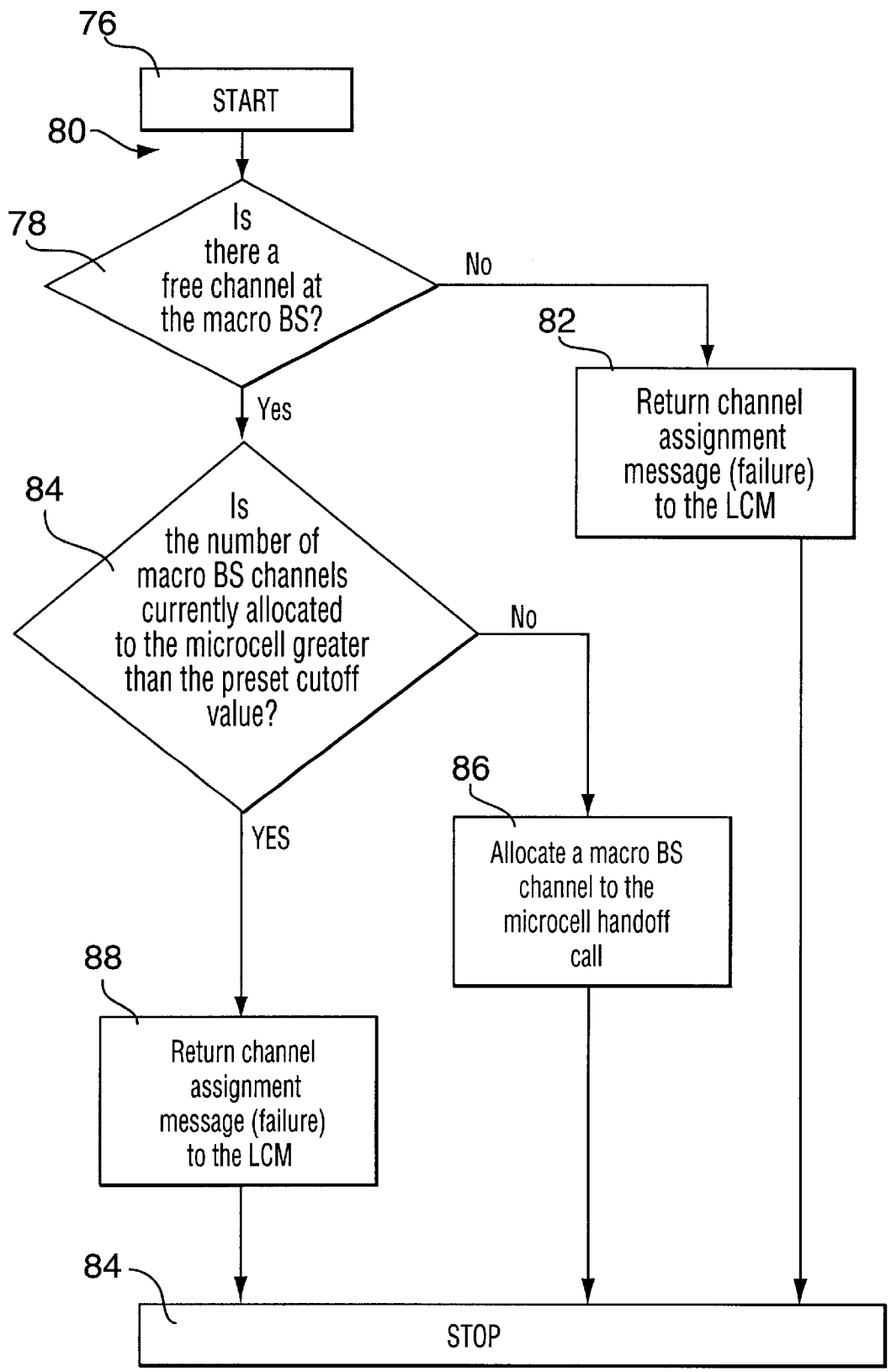
FIGS. 5a and 5b are flowcharts of a channel allocation process used by Global Channel Manager according to an embodiment of the invention.

A channel allocation process used by the GCM for voice calls according to an embodiment of the invention will be described further in more detail with reference to FIG. 5a. Upon start up (block 76), the GCM determines whether a free channel at the macroBS is available (block 78). If none of the channels is available, a return channel assignment message (failure) is sent to the LCM (block 82), and the algorithm is terminated (block 84). The GCM keeps a record of the number of free and busy channels at each macroBS and, in addition, it also keeps track, for each macroBS in the network, of the number of macroBS channels that have been allocated to each of the microcells underlaying a macrocell. Different criteria may be used to avoid deterioration of grade of service for macrocell subscribers below the preset level. According to one set of criteria there is a maximum number of allowable macrocell traffic channels that can be allocated to each microcell (a so-called "cutoff value"), and a grade of service is deemed acceptable when number of macrocell channels assigned to each microcell is less than the cutoff value. According to another set of criteria a threshold number of macrocell channels is introduced in each macrocell, and a grade of service is deemed acceptable when more than a threshold number of macrocell channels are available in that macrocell. The GCM maintains a database of cutoff values for each underlaying microcell and a database of threshold number of traffic channels for each macrocell. In one embodiment all the microcells underlaying a macrocell have the same cutoff value which is set equal to the total number of channels provisioned at the macroBS. In another embodiment the cutoff value is set equal to a number lower than the total number of channels provisioned at the macroBS. Also the cutoff values need not be set exactly to the same number for all the underlaying microcells and they can be configurable. In another embodiment each of the macrocells has the same threshold number of traffic channels which is lower than a total number of traffic channels assigned to that macrocell. Also the threshold number of traffic channels for each macrocell need not be exactly the same for all macrocells. It may be different and configurable independently of the threshold numbers of traffic channels configured for other macrocells.

If a free macrocell traffic channel is available, the GCM checks out whether the microcell-originator of the channel request message is using a number of channels below the preset cut-off value (block 84). If so, the GCM allocates a free macroBS channel (via the macroBSC and the macroBS) to the overflow microcell handoff call (box 86), updates the macroBS channel usage counter for the microcell (not shown in FIG. 5a) and stops its operation until a further request is received (box 84). Otherwise a return channel assignment message (failure) is returned to the LCM (box 88), and the GCM stops its operation until a further request is received (box 84).

Figure 5B:
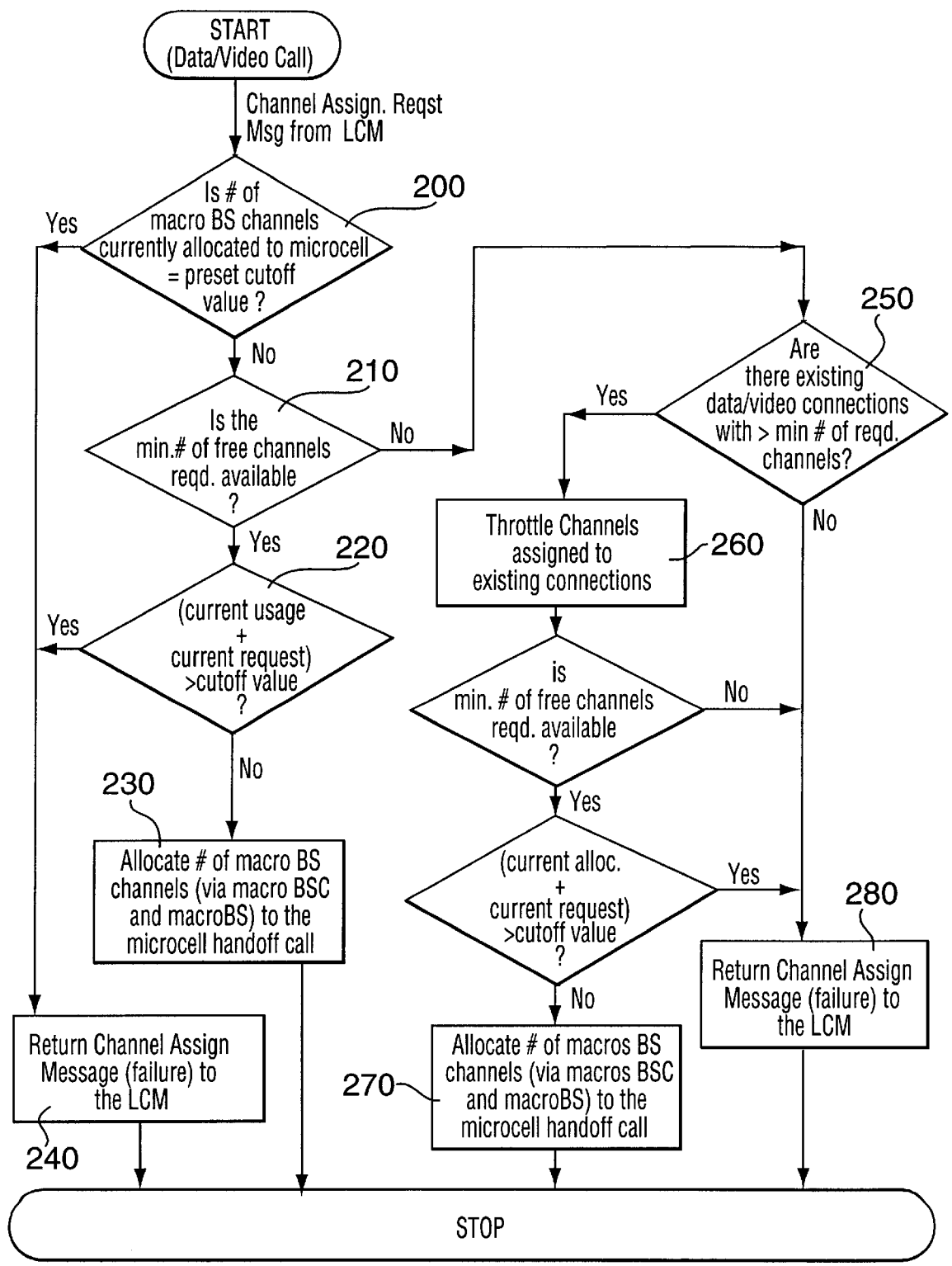

FIG. 5b shows the block diagram of the channel allocation algorithm used by the GCM for admitting an overflow microcell data or video call to a macrocell. If the traffic type is data or video, the GCM allocates the minimum number of channels required by the call 230 if the following three conditions are satisfied: the number of macroBS channels already allocated to the microcell is below the cutoff value for the microcell 200, the minimum number of channels required is available 210, and the sum of the current usage and the new allocation is less than or equal to the cutoff value 220. Otherwise, the GCM returns a failure message to the microcell BSC 240. If the number of macroBS channels already allocated to the microcell is below the cutoff value for the microcell but the minimum number of channels required by the microcell call is not available (no to decision block 210), the GCM then preferably enters a throttling down mode 250 in which the GCM creates additional free channels 260 by reducing the channels already allocated to existing data and video calls (see flowchart of FIG. 4a for example process). At the end of throttling down mode, the GCM allocates the minimum number of channels required by the microcell call 270 provided the following conditions are satisfied: the minimum number of channels required is available and the sum of the current macroBS channel usage and the new channel allocation is less than or equal to the cutoff value. Otherwise, the GCM returns a failure message to the microcell BSC 280. Also, if all the existing data and video calls are already operating at their minimum channel usage, the GCM returns a failure message to the microcell BSC 280.

At the completion of each call, the GCM preferably invokes the channel throttling up mode algorithm to increase the channel allocation of existing data and video calls that are connected with less than the number of channels required (FIG. 4b).

As stated previously, the GCM manages the allocation of macroBS channels at all the macrocells in the network. The GCM also keeps record of the number of free and busy channels at each macroBS. Thus a similar process is carried out for controlling the macrocell channels allocated to terminals, for example mobile terminal 14, which originate calls directly to a macroBS, or request macrocell channels as a result of a macrocell-to-macrocell handoff. For example, at each call setup instant the macroBS, whose cell the call originates from, sends a channel assignment request message to the GCM. The GCM then determines if sufficient channels are available in the macrocell, and preferably throttles existing data calls if needed to make requested channels available.

The ability to manage the balance between microcell and macrocell grade of service by configuring different cutoff values at each microcell or different threshold numbers of traffic channels at each macrocell makes the proposed channel allocation system very flexible and allows for easy adaptation to the ever-changing communication traffic. This is especially beneficial to network operation in high traffic density areas and in non-homogeneous traffic environments, because it allows network operators to fully exploit the network capacity by redistributing network resources from areas of relatively light load to areas of heavy demand. For example, if the load in the area covered by the microcell i is greater than the load in the area covered by microcell j, the microcells can be configured with cutoff values $c_i$ and $c_j$ respectively where $c_i > c_j$. As a result, overall blockage of the calls in both microcells will be minimized without increase in the blockage of macrocells, which in turn means better grade of service for all network subscribers.

Note that we have only illustrated the optional process of throttling channels (e.g., decreasing the number of channels allocated to existing data calls) for requests for channels by data calls (i.e., in FIGS. 3b and 5b). However, this process can also be used to free channels for requests for voice channels. Indeed, FIGS. 3a and 5a can be thought of as special cases of FIGS. 3b and 5b with the minimum channel=maximum channel=1 and the type of call=voice.

Note that in FIGS. 3 and 5, a terminal which should be served by a microcell (as determined for example by the terminal location, or velocity) is only allocated macrocell channels if the requested channels are requested to implement a microcell to microcell handoff.

Figure 6A:
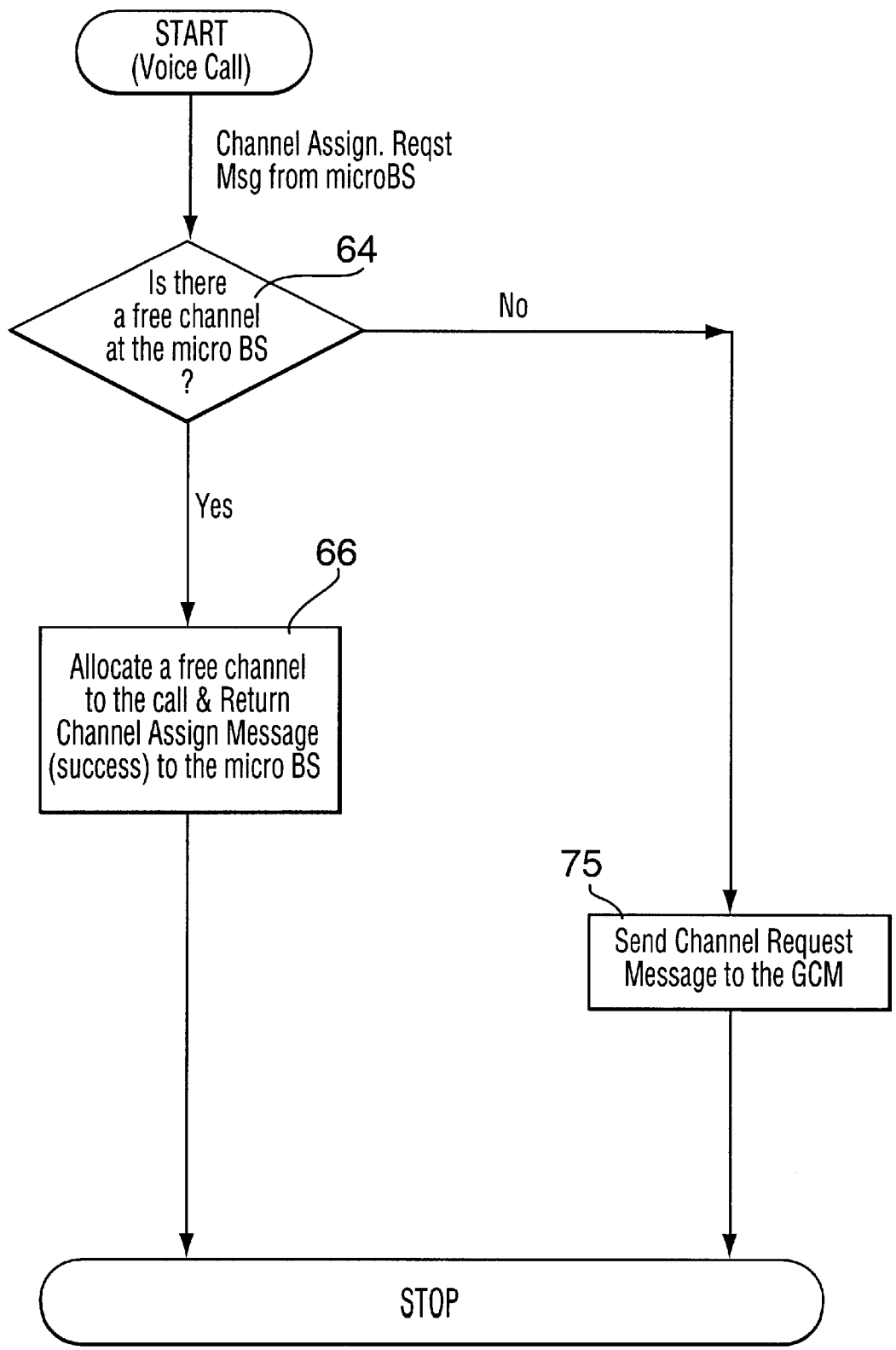
FIGS. 6a and 6b are flowcharts of a channel allocation process used by Local Channel Manager according to an alternative embodiment of the invention.
Figure 6B:
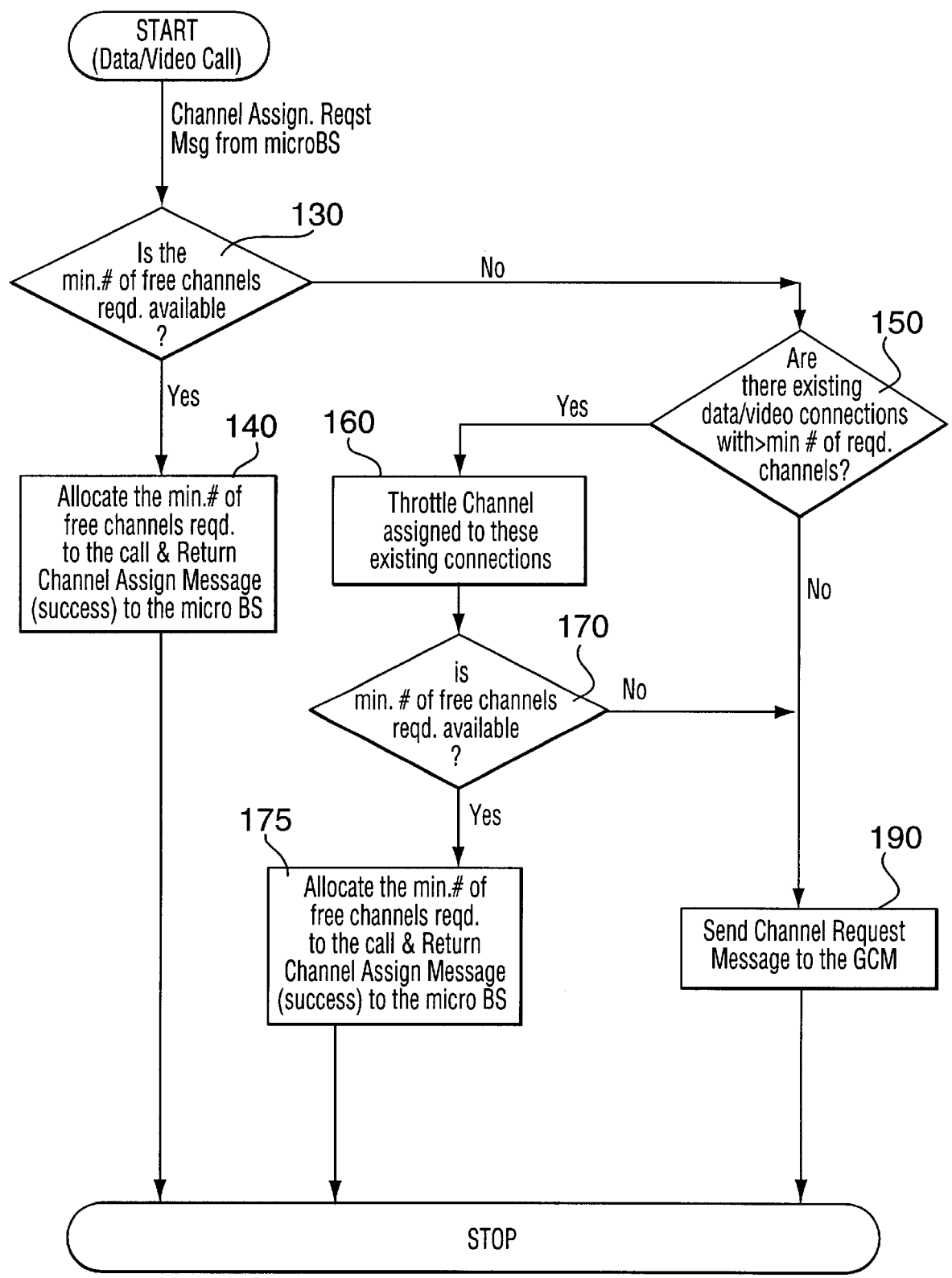
Figure 7A:
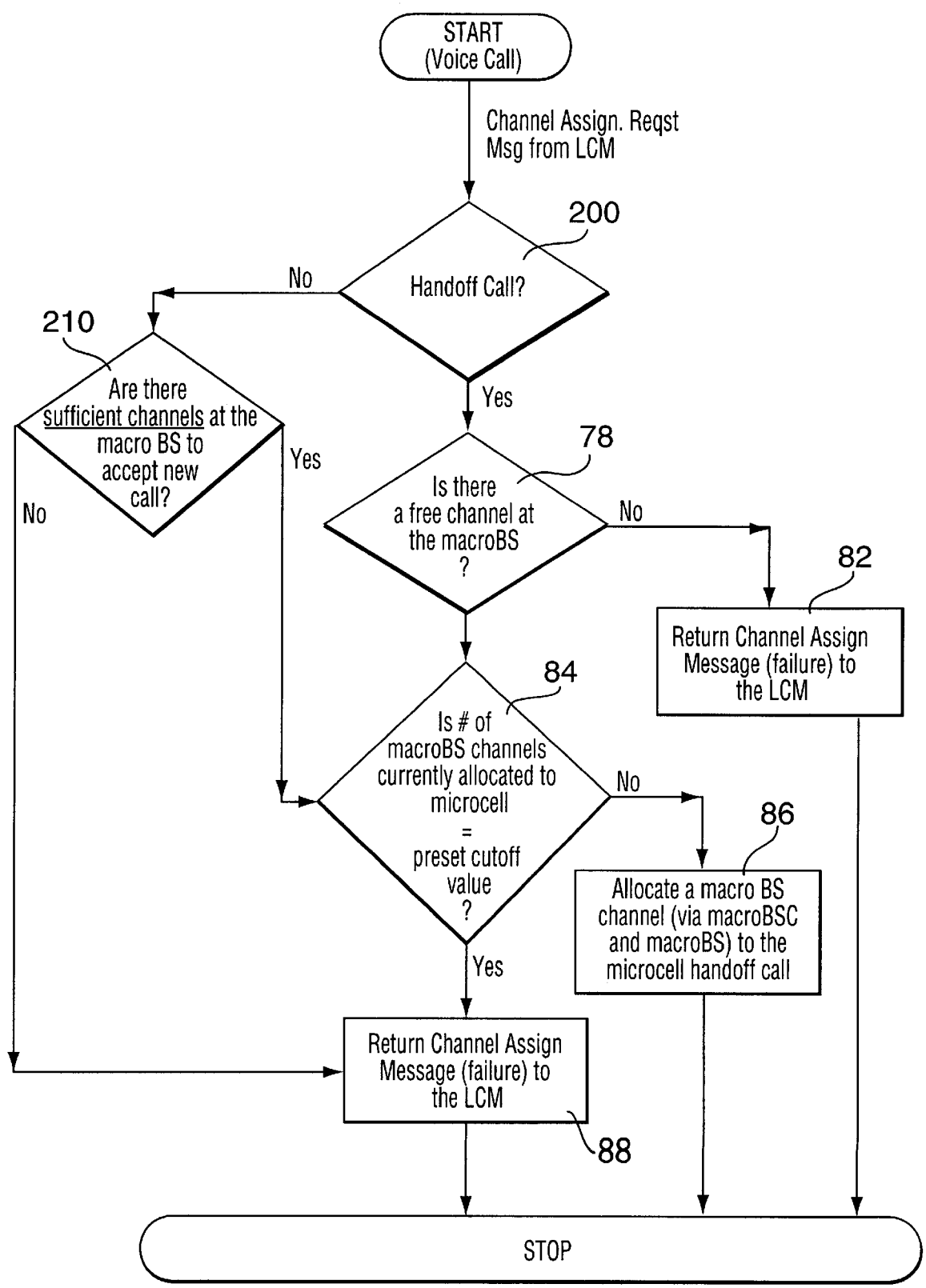
FIGS. 7a and 7b are flowcharts of a channel allocation process used by Global Channel Manager according to an alternative embodiment of the invention.
Figure 7B:
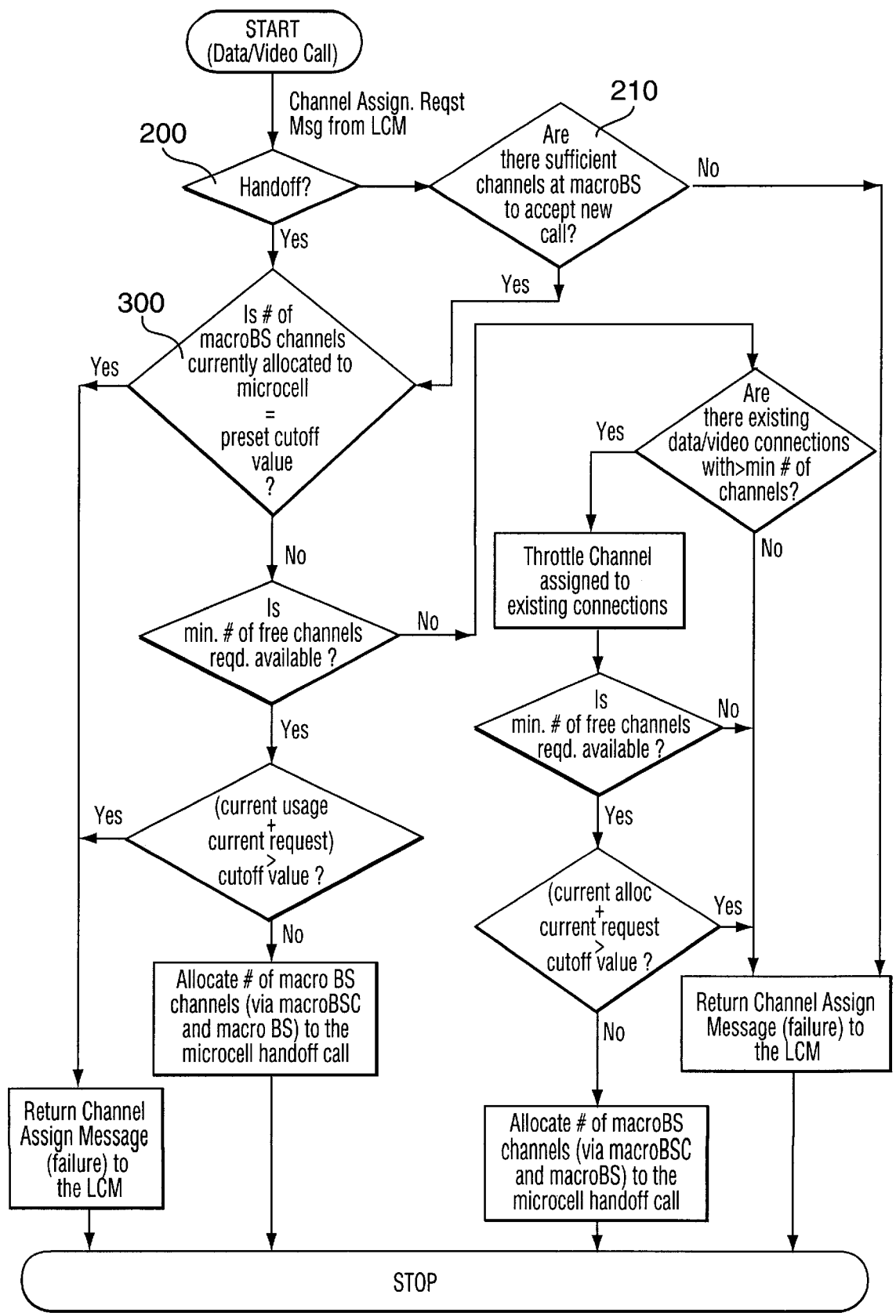

However, in an alternative embodiment illustrated in FIGS. 6 and 7, the system will allow new call setup requests from microcells to be allocated macrocell channels (or macrochannels) if there are ample channels available in the macrocell, based on the Grade of Service requirements for that macrocell. For example, suppose a macrocell has a maximum number of channels of 25 and its threshold for acceptance of new calls from a microcell is configured at 15 channels (i.e., a new microcell call setup request is assigned a macrocell channel if at least 15 macrocell channels are available). If, for example, 20 macrocell channels are available at the time the new microcell call setup request is made, then there are ample macrochannels to allocate to the microcell user without degrading service to macrocell users (both new macrocell call setup request and macrocell-to-macrocell handoff attempts). In such a circumstance, the alternative embodiment will allocate requested channels to the new microcell call setup request. Thus this alternative embodiment has two thresholds, a first threshold for determining whether there are sufficient channels available for allowing new call setup attempts from microcells to receive macrochannels and a second threshold which is less than said first threshold for determining whether there are sufficient channels available for an existing call requesting channels for a handoff, wherein said second threshold represents the cut-off value for controlling the number of macrochannels that can be used by a microcell. Thus, FIGS. 7a and 7b add this enquiry (steps 200 and 210) to the process illustrated in FIGS. 5a and 5b respectively. Similarly FIGS. 6a and 6b remove the requirement that the request be for handoff from the process illustrated in FIGS. 3a and 3b respectively (e.g., remove steps 68 and 70 or steps 180 and 185 respectively).

It should be appreciated that various other alternatives can be used. For example, FIGS. 1 and 2 illustrate an arrangement where the microBSC 30 and the macroBSC 16 are separate and only communicate via MSC 32, and wherein LCM 50 is associated with microBSC 30 and GCM 52 is associated with MSC 32. However, the microcell BSC's can be co-located with macrocell BSC's. In such an arrangement, the GCM can be associated with the macrocell BSC, and/or the LCM and GCM can even be combined using a single processor, given sufficient processing.

As another example of alternative arrangements, we have discussed the preferred embodiments with request messages which only specify a minimum and maximum number of channels. An intermediate number can also be specified which indicated the optimum number of channels, based on typical expectations of system load. For example, a non real-time multimedia transfer can function (although slowly) with a minimum number of channels of 1, and the more channels allocated, the faster the transfer (upto the maximum transmission speed that the application or the network can allow). However, assuming a normal load on the system, a intermediate number of 3 channels may be initially allocated to the requesting terminal to approximate an ISDN throughput speed. This intermediate number of channels can be allocated initially if system capacity allows, and then this number may be throttled down to the minimum or up to the maximum as desired for optimal system performance. However, if the system is near capacity, the call will only be allocated the minimum number of channels, or blocked depending on the system load.

Also note that according to the described embodiments, existing data calls are throttled down when the system receives a new request for channels in order to free up channels for the current request. As another alternative, the system can speed up call processing by throttling down existing data calls after any new channels are allocated in order to free up channels for the next incoming call. This alternavtive embodiment can allow a faster call set up, but at the expense of decreasing the number of channels allocated to data calls, possibly needlessly if no new requests are received.

While particular embodiments of the present invention have been described and illustrated, it should be understood that the invention is not limited thereto since modifications may be made by persons skilled in the art. The present application is intended to cover any and all modifications which are within the scope and spirit of the invention as defined by the appended claims.

What is claimed is:

1. A method for controlling allocation of traffic channels in a telecommunications network having macrocells and microcells within said macrocells, the method comprising:
   receiving a request for a number of microcell traffic channels in a particular microcell; and
   allocating said number of macrocell traffic channels in a macrocell containing said particular microcell when and only when:
      (a) insufficient microcell traffic channels are available in said particular microcell;
      (b) sufficient macrocell traffic channels are available in said macrocell; and
      (c) the requested microcell traffic channels are requested to implement a microcell to microcell handoff;
   wherein step (a) comprises the step of determining whether sufficient microcell traffic channels can be made available by throttling down the number of microcell channels allocated to existing data calls, and if so, then throttling down the number of microcell channels allocated to existing data calls until sufficient microcell channels are made available to satisfy said request.

2. A method as defined in claim 1, wherein the macrocell traffic channel is allocated when and only when conditions (a), (b) and (c) are met, and:
      (d) a grade of service in said macrocell is deemed to be acceptable.

3. A method as defined in claim 2, wherein said grade of service in said macrocell is deemed acceptable when the number of macrocell channels assigned to each microcell is less than a predetermined maximum number (cutoff value) of allowable macrocell channels that can be assigned to each microcell.

4. The method as claimed in claim 1 wherein, if step (a) determines insufficient microcell traffic channels are available in said particular microcell, step (b) comprises determining whether additional macrocell traffic channels can be made available by throttling down the number of macrocell channels allocated to existing data calls, and if so, then throttling down the number of macrocell channels allocated to existing data calls until sufficient macrocell channels are made available to satisfy said request.

5. The method as claimed in claim 4 further comprising the step of throttling up the number of channels allocated to existing data calls if free channels are available.

6. A method as defined in claim 5, wherein said cutoff value for each microcell is configurable independently of the cutoff values configured for other microcells.

7. A method as defined in claim 5, wherein said grade of service in said macrocell is deemed acceptable when more than a threshold number of macrocell channels are available in said macrocell.

8. A method as defined in claim 5, wherein:
   the request for said number of microcell traffic channels in a particular microcell is received at a local channel manager;

the local channel manager allocates said number of microcell traffic channels when at least said number of microcell traffic channels are available in said particular microcell;

the local channel manager sends a message to a global channel manager when insufficient microcell traffic channels are available in said particular microcell and the requested microcell traffic channels are required to implement a microcell to microcell handoff; and the global channel manager causes said number of macrocell traffic channels to be allocated in response to said message when and only when said number of macrocell traffic channels are available in said macrocell and grade of service in said macrocell deemed to be acceptable.

9. A method as defined in claim 8, wherein said request for a number of channels includes a minimum and maximum number of channels for a data call, and wherein said number is said minimum number for the purpose of steps (a) and (b), and wherein the actual number of channels allocated to said call can be throttled down to said minimum number and throttled up to said maximum number.

10. A telecommunications system having macrocells and microcells within said macrocells, the system comprising a local channel manager and a global channel manager operable to carry out the method of claim 9.

11. A processor-readable storage medium for storing instructions for execution by a processor, said instructions comprising instructions for carrying out the method of claim 9.

12. A telecommunications system having macrocells and microcells within said macrocells, the system comprising a local channel manager and a global channel manager operable to carry out the method of claim 8.

13. A method as defined in claim 5, wherein said request for a number of channels includes a minimum and maximum number of channels for a data call, and wherein said number is said minimum number for the purpose of steps (a) and (b), and wherein the actual number of channels allocated to said call can be throttled down to said minimum number and throttled up to said maximum number.

14. A method as defined in claim 1, wherein:

the request for said number of microcell traffic channels in a particular microcell is received at a local channel manager;

the local channel manager allocates said number of microcell traffic channels when at least said number of microcell traffic channels are available in said particular microcell;

the local channel manager sends a message to a global channel manager when insufficient microcell traffic channels are available in said particular microcell and the requested microcell traffic channels are required to implement a microcell to microcell handoff; and the global channel manager causes said number of macrocell traffic channels to be allocated in response to said message when and only when said number of macrocell traffic channels are available in said macrocell and grade of service in said macrocell deemed to be acceptable.

15. A telecommunications system having macrocells and microcells within said macrocells, the system comprising a local channel manager and a global channel manager operable to carry out the method of claim 14.

16. A processor-readable storage medium for storing instructions for execution by a processor, said instructions comprising instructions for responding to a request for a number of microcell traffic channels in a particular microcell by:

a) determining whether at least said number of microcell traffic channel is available in said particular microcell;

b) if not, determining whether said number of microcell traffic channels in said particular microcell can be made available by decreasing the number of channels allocated to existing data calls, and if so then making said channels available;

c) allocating said number of microcell traffic channels in said particular microcell if said number of channels is available; and d) sending a message to a remote processor when said number of microcell traffic channels are not available in said particular microcell.

17. A processor-readable storage medium as claimed in claim 16 wherein said instructions further comprise instructions to determine whether said request is a request for handoff, and instructions to only send said message to a remote processor if said request is a request for handoff.

18. A processor-readable storage medium for storing instructions for execution by a processor, said instructions comprising:

instructions for receiving a message sent from a remote processor for controlling the allocation of microcell traffic channels within a macrocell, said messages requesting allocation of a number of macrocell traffic channels from said macrocell; and instructions for responding to said message by causing said number of macrocell traffic channels to be allocated in said macrocell when at least said number macrocell traffic channels are available in said macrocell and a grade of service in said cell is deemed to be acceptable, wherein said instructions further comprise instructions to determine whether additional macrocell traffic channels can be made available by throttling down the number of macrocell channels allocated to existing data calls, and if so, then throttling down the number of macrocell channels allocated to existing data calls until sufficient macrocell channels are made available to satisfy said request.

19. A method for controlling allocation of traffic channels in a telecommunications network having macrocells and microcells within said macrocells, the method comprising:

(a) receiving a request for a number of microcell traffic channels in a particular microcell;

(b) determining whether there are insufficient microcell traffic channels available in said particular microcell;

(c) allocating said requested number of microcell traffic channels if sufficient microcell channels are available;

(d) responsive to step (b) determining that insufficient microcell channels are available:

i) determining whether sufficient macrocell traffic channels are available in said macrocell;

ii) allocating macrocell channels if sufficient channels are available; and iii) sending a message indicating insufficient channels are available if sufficient channels are not available;

wherein step (b) comprises determining whether additional microcell traffic channels can be made available by throttling down the number of microcell channels allocated to existing data calls.

20. The method as claimed in claim 19 wherein step (d(i)) comprises determining whether additional macrocell traffic channels can be made available by throttling down the number of macrocell channels allocated to existing data calls.

21. The method as claimed in claim 20 further comprising the step of throttling up the number of channels allocated to existing data calls if free channels are available.

22. The method as claimed in claim 21 wherein step (d(i)) comprises determining whether said request is for a new call or for an existing call requesting channels for a handoff.

23. The method as claimed in claim 22 wherein step (d(i)) comprises determining there are sufficient channels available for a new call according to a first threshold and determining there are sufficient channels available for an existing call requesting channels for a handoff according to a second threshold which is less than said first threshold.

24. A wireless telecommunications network comprising
microcells;
macrocells;
basestations for communicating with terminals within said cells;
controllers for said basestations; and
a mobile switching centre (MSC);
wherein said controllers and MSC contain processors for carrying out the method as claimed in claim 23.

25. The method as claimed in claim 20 wherein step (d(i)) comprises determining whether said request is for a new call or for an existing call requesting channels for a handoff.

26. The method as claimed in claim 25 wherein step (d(i)) comprises determining there are sufficient channels available for a new call according to a first threshold and determining there are sufficient channels available for an existing call requesting channels for a handoff according to a second threshold which is less than said first threshold.

27. A wireless telecommunications network comprising
microcells;
macrocells;
basestations for communicating with terminals within said cells;
controllers for said basestations; and
a mobile switching centre (MSC);
wherein said controllers and MSC contain processors for carrying out the method as claimed in claim 26.

28. A processor-readable storage medium for storing instructions for execution by a processor, said instructions comprising instructions for carrying out the method of claim 21.

29. A wireless telecommunications network comprising
microcells;
macrocells;
basestations for communicating with terminals within said cells;
controllers for said basestations; and
a mobile switching centre (MSC);
wherein said controllers and MSC contain processors for carrying out the method as claimed in claim 19.

30. A processor-readable storage medium for storing instructions for execution by a processor, said instructions comprising instructions for carrying out the method of claim 19.

31. A wireless telecommunications network comprising
microcells;
macrocells;
basestations for communicating with terminals within said cells;
controllers for said basestations; and
a mobile switching centre (MSC);
wherein said controllers and MSC contain processors for carrying out a Call admission control scheme at a microcell which includes throttling the channels already assigned to existing data and video calls and allowing only blocked microcell-to-microcell handoff traffic to overflow to the macrocell; and carrying out a Call admission control scheme at a macrocell which includes throttling the channels already assigned to existing data and video calls and also controlling the number of macrocell channels that can be used for supporting overflow microcell-to-microcell handoff traffic.

* * * * *